(12) United States Patent
Yoshino

(10) Patent No.: US 6,278,774 B1
(45) Date of Patent: Aug. 21, 2001

(54) COMMUNICATION APPARATUS CAPABLE OF CONNECTING TO COMMUNICATION NETWORK PROVIDING CALLING LINE IDENTIFICATION PRESENTATION SERVICE, ITS CONTROL METHOD, AND STORAGE MEDIUM STORING ITS CONTROL PROGRAM

(75) Inventor: Motoaki Yoshino, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/004,514

(22) Filed: Jan. 8, 1998

(30) Foreign Application Priority Data

Jan. 10, 1997 (JP) .................................................. 9-014674
Dec. 18, 1997 (JP) .................................................. 9-364680

(51) Int. Cl.$^7$ ................................................ H04M 11/00
(52) U.S. Cl. .......................... 379/100.14; 379/100.14; 379/100.16; 379/93.09; 379/355; 379/142
(58) Field of Search ....................... 379/100.14, 100.15, 379/100.16, 100.01, 142, 355, 216, 93.09; 358/440

(56) References Cited

U.S. PATENT DOCUMENTS

| 5,239,576 | * | 8/1993 | Yoshida et al. | 379/355 |
| 5,309,508 | * | 5/1994 | Rosen | 379/142 |
| 5,341,411 | * | 8/1994 | Hashimoto | 379/142 |
| 5,426,693 | * | 6/1995 | Rosen | 379/142 |
| 5,588,049 | * | 12/1996 | Detering et al. | 379/355 |

* cited by examiner

*Primary Examiner*—Stella Woo
(74) *Attorney, Agent, or Firm*—Fitzpatrick, Cella, Harper, & Scinto

(57) ABSTRACT

An object of the present invention is to effectively utilize functions of a communication apparatus which can be connected to a communication network providing a call line identification presentation service. In order to achieve this object, setting as to whether or not call line identification presentation is to be performed to a communication destination is switched according to a communication mode at a time of call generation, and a call is actually generated based on the switched and thus selected setting, thereby improving operability in the switching as to whether or not the call line identification presentation is to be performed.

57 Claims, 6 Drawing Sheets

COMMUNICATION APPARATUS CAPABLE OF CONNECTING TO COMMUNICATION NETWORK PROVIDING CALLING LINE IDENTIFICATION PRESENTATION SERVICE, ITS CONTROL METHOD, AND STORAGE MEDIUM STORING ITS CONTROL PROGRAM

BACKGROUND OF THE INVENTION

1. Field of the Invention

The present invention relates to a communication apparatus, especially to the communication apparatus which can be connected to a communication network such as a public switched telephone network (PSTN), an integrated services digital network (ISDN) or the like which provides an additional service such as call line identification presentation (CLIP).

2. Related Background Art

Conventionally, in an ISDN, services such as call line identification presentation (CLIP) to notify a connected destination party of an originating-station subscriber's number and call line identification restriction (CLIR) to inhibit from notifying the connected destination party of the originating-station subscriber's number have been provided as additional services. Further, in recent years, similar services have been started in a PSTN.

However, in a conventional communication apparatus, an operation to be performed when the apparatus is connected to the network providing such the services must be registered as an initial setting value of the apparatus itself, or it must be manually determined which mode a call is to be generated in, every time a communication operation is performed.

For this reason, in such a conventional example, for example, even if the communication apparatus has a speaking function as a telephone and an image communication function as a facsimile apparatus, this communication apparatus operates only based on the initial setting value. Therefore, it is impossible to perform fine and flexible controlling such as "the CLIP is selected in speaking, and the CLIR is selected in image communication" or "the CLIP is always selected for the specific destination party which has been stored in the form of a shortened dial or the like, and the CLIR is always selected for the other destination parties".

Moreover, for example, a CLIR key or a CLIP key must be depressed to designate the mode every time the communication operation is performed.

SUMMARY OF THE INVENTION

An object of the present invention is to enable, by automatically switching call line identification presentation (CLIP) and call line identification restriction (CLIR) according to a communication mode at a time of call generation, fine and flexible controlling, e.g., the CLIP in facsimile communication but the CLIR in telephone speaking.

An another object of the present invention to enable selecting of the CLIP and the CLIR independently for each destination party which has been registered in a memory dial such as a shortened dial or the like.

A further another object of the present invention is to improve operability in the switching between the CLIP and the CLIR, based on a combination of basic setting of a communication apparatus and setting of each communication.

The above and other objects, features, and advantages of the present invention will be apparent from the following detailed description and the appended claims in conjunction with the accompanying drawings.

DETAILED DESCRIPTION OF THE PREFERRED EMBODIMENTS

Figure 1:
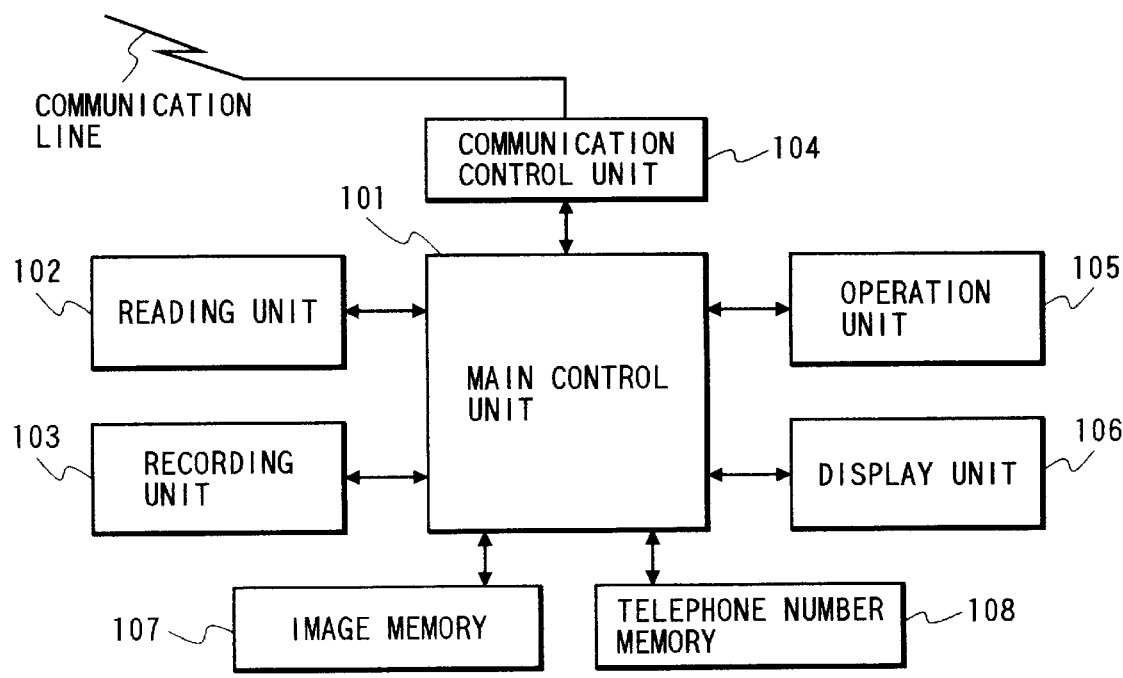
FIG. 1 is a block diagram showing structure of a facsimile apparatus according to a first embodiment of the present invention.

FIG. 1 is a block diagram showing the structure of a facsimile apparatus which realizes a first embodiment of the present invention.

The structure of a communication control unit, a connecting method to a communication line, procedure for utilizing additional services such as, e.g., a call line identification presentation (CLIP), and the like of a communication apparatus to be connected to a public switched telephone network (PSTN) are slightly different from those of a communication apparatus to be connected to an integrated services digital network (ISDN). However, since the essence of the present invention is common to both the communication apparatuses, the present embodiment will be explained, by way of example, with the facsimile apparatus to be connected to the PSTN.

In FIG. 1, a main control unit 101 controls the facsimile apparatus as a whole. The main control unit 101 is composed of a CPU which is the center of controlling and operates according to a program, a ROM in which the program, system data and the like used by the CPU to execute the controlling are stored, and a RAM which is used as a working area or the like.

It is assumed that the CPU of the main control unit 101 which reads the program stored in the ROM executes the hereinafter-explained operation of the communication apparatus.

A reading unit 102 which is composed of a contact-type image sensor, an original feeding mechanism and the like reads an original or the like to be transmitted. A recording unit 103 which is an ink-jet printer, a laser beam printer or the like prints a received image or the like.

A communication control unit 104 is composed of a modem, a network control unit (NCU) and the like. The communication line such as a public telephone line or the like is connected to the communication control unit 104.

An operation unit 105 is a keyboard or the like which performs various key inputting, e.g., a CLIP/CLIR switch key for switching the CLIP and call line identification restriction (CLIR). A display unit 106 is a light-emitting diode (LED), a liquid crystal display (LCD) or the like which performs various displaying.

An image memory 107 is the memory which stores a received image and an image read to be transmitted. In a page printer, the received image is once stored in the image memory 107 and then recorded by the recording unit 103.

A telephone number memory 108 is the memory which is used to store telephone numbers in a memory dial such as a one-touch dial, a shortened dial or the like. The telephone number memory 108 is composed of a non-volatile memory such as an SRAM, a flash memory or the like which is backed up by a battery.

As the basic setting of the communication apparatus, the facsimile apparatus in the present embodiment has a basic setting function for switching the CLIP and the CLIR, and a temporary setting function for switching the CLIP and the CLIR every communication.

Figure 2:
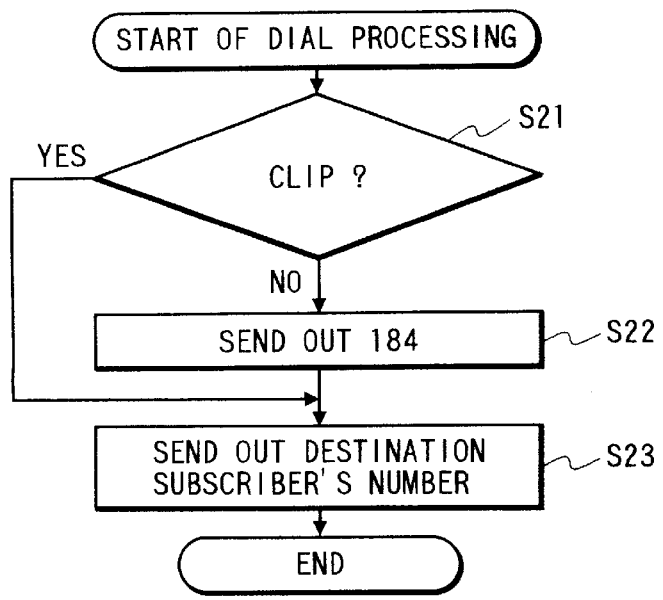
FIG. 2 is a flow chart showing first call generation processing in the first embodiment of the present invention.

FIG. 2 is a flow chart showing the operation at the time when a call is generated to the PSTN in which the CLIP has been set as the basic setting.

Initially, in a step S21, if a call generation control variable flag_cli is set as flag_cli=CLIP=0, the flow directly advances to a step S23 to send out a destination subscriber's number.

Further, if flag_cli=CLIR=1, a number (e.g., 184) for notifying the network of the CLIR is sent out in a step S22. Then, the flow advances to the step S23 to send out the destination subscriber's number.

Figure 3:
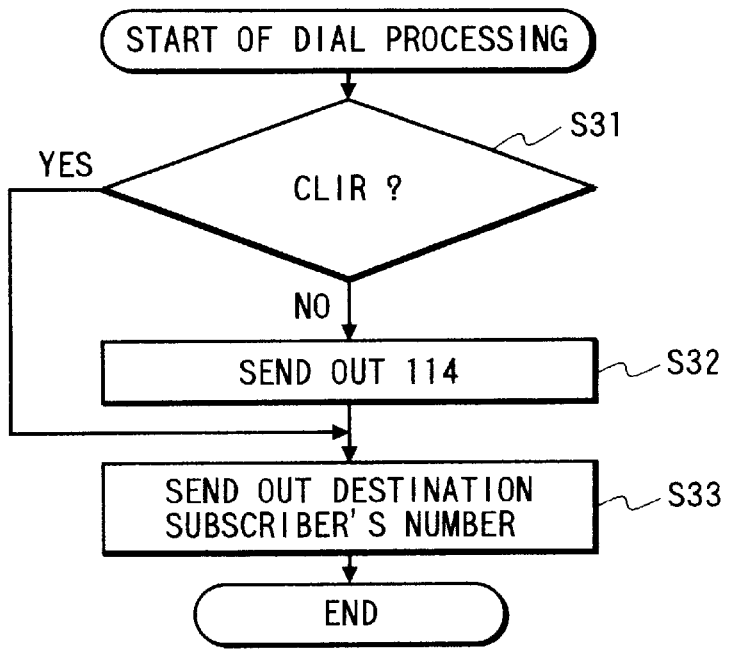
FIG. 3 is a flow chart showing second call generation processing in the first embodiment of the present invention.

Contrary to FIG. 2, FIG. 3 is a flow chart showing the operation at the time when the call is generated to the PSTN in which the CLIR has been set as the basic setting.

Initially, in a step S31, if the call generation control variable flag_cli=CLIP=0, a number (e.g., 114) for notifying the network of the CLIP is sent out in a step S32. Then, the flow advances to a step S33 to send out the destination subscriber's number.

Further, if flag_cli=CLIR=1 in the step S31, the flow directly advances to the step S33 to send out the destination subscriber's number.

Figure 4:
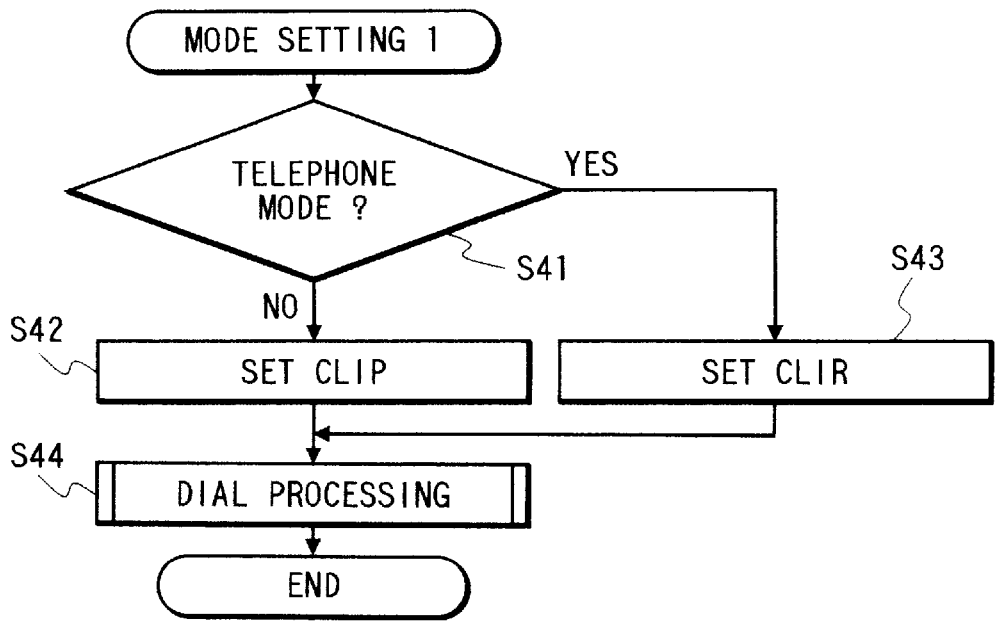
FIG. 4 is a flow chart showing setting processing of call line identification presentation (CLIP)/call line identification restriction (CLIR) in the first embodiment of the present invention.

FIG. 4 is a flow chart showing the setting processing (mode setting 1) of the CLIP/CLIR in the first embodiment of the present invention.

As shown in FIG. 4, a communication mode after the call was generated and set is judged in a step S41. In this case, if the object of such the call generation is directed to a facsimile communication, the flow advances to a step S42 to set flag_cli=CLIP=0. Then, the flow advances to a step S44 to execute the dial processing shown in FIG. 2 or 3.

On the other hand, if the object of the call generation is directed to the telephone speaking, the flow advances to a step S43 to set flag_cli=CLIR=1. Then, the flow advances to the step S44 to execute the dial processing shown in FIG. 2 or 3.

Thus, while the CLIR can be always set in a telephone mode, the CLIP can be always set in a facsimile transmission mode. In this case, it was explained that "CLIR" is set in the telephone mode and "CLIP" is set in the facsimile communication mode. However, of course, the CLIP and the CLIR can be set in each of other communication modes.

Further, various methods have been conventionally known to judge whether the setting mode is the telephone mode or the facsimile communication mode.

For example, the following methods are applicable.

(1) If a dialing operation or an on-hook dialing operation is performed with raise of a handset, the mode is judged as the telephone mode. On the other hand, if not so, the mode is judged as the facsimile communication mode.

(2) If an original is set and the dialing operation is performed, the mode is judged as the facsimile communication mode. On the other hand, if the dialing operation is performed without any original, the mode is judged as the telephone mode.

Figure 5:
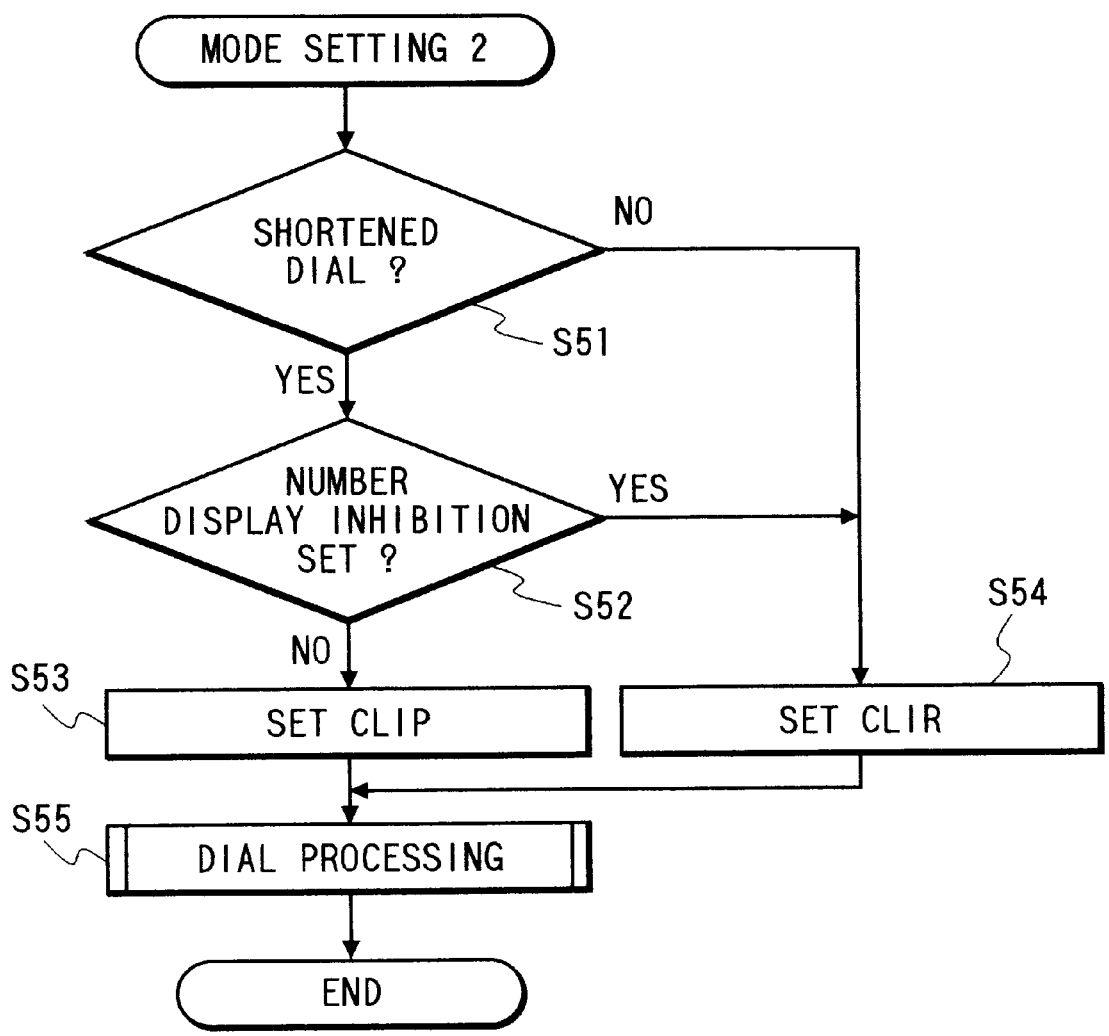
FIG. 5 is a flow chart showing the setting processing of CLIP/CLIR in a second embodiment of the present invention.

Subsequently, FIG. 5 is a flow chart showing the setting processing (mode setting 2) of the CLIP/CLIR in a second embodiment of the present invention.

As shown in FIG. 5, it is judged in a step S51 whether or not the call is generated by the shortened dial. If not, since the destination can not be identified, the flow directly advances to a step S54 to set flag_cli=CLIR=1. Then, the flow advances to a step S55 to execute the dial processing shown in FIG. 2 or 3.

On the other hand, if it is judged in the step S51 that the call is generated by the shortened dial, the flow advances to a step S52. In the step S52, additional information which is the setting information of CLIP/CLIR and has been registered together with the shortened dial is judged. Thus, it is judged whether or not the call is generated to the destination to which the CLIP should be performed. If the call is generated to the destination to which the CLIP should not be performed, the flow advances to the step S54 to set flag_cli=CLIR=1. Then, the flow advances to the step S55 to execute the dial processing shown in FIG. 2 or 3.

On the other hand, if the call is generated to the destination to which the CLIP should be performed, the flow advances to a step S53 to set flag_cli=CLIP=0. Then, the flow advances to the step S55 to execute the dial processing shown in FIG. 2 or 3.

Figure 6:
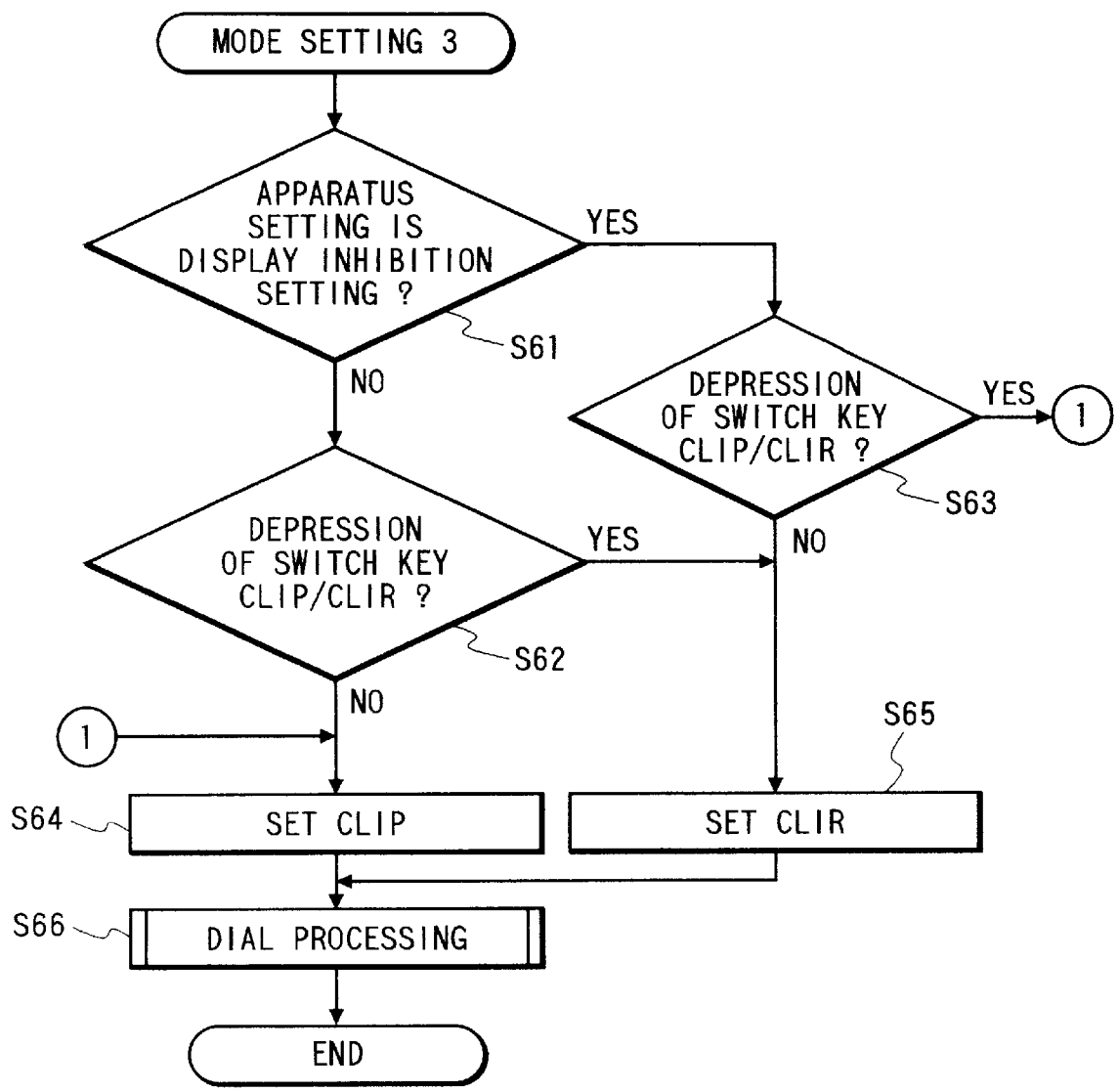
FIG. 6 is a flow chart showing the setting processing of CLIP/CLIR in a third embodiment of the present invention.

Subsequently, FIG. 6 is a flow chart showing the setting processing (mode setting 3) of the CLIP/CLIR in a third embodiment of the present invention.

As shown in FIG. 6, it is judged in a step S61 whether or not the basic setting of the communication apparatus is "CLIP" or "CLIR", and then the value of flag_cli is set based on the results of judging as to the depressing state of the CLIP/CLIR switch key in steps S62 and S63. Subsequently, the flow advances to a step S66 to execute the dial processing shown in FIG. 2 or 3.

The logic to determine the value of flag_cli is as follows.

Initially, in the step S61, it is judged whether the basic setting of the communication apparatus is "CLIP" or "CLIR".

In the case where the basic setting is "CLIP", it is judged in the step S62 whether or not the CLIP/CLIR switch key is depressed. If not, since it is selected the operation with the basic setting being maintained as it is, the flow advances to a step S64 to set flag_cli=CLIP=0. On the other hand, if the CLIP/CLIR switch key is depressed in the step S62, since the "CLIR" is selected in the call generation just at that particular time, the flow advances to a step S65 to set flag_cli=CLIR=1.

Further, in the case where the basic setting is "CLIR" in the step S61, it is judged in the step S63 whether or not the CLIP/CLIR switch key is depressed. If not, since it is selected the operation with the basis setting being maintained as it is, the flow advances to the step S65 to set flag_cli=CLIR=1. On the other hand, if the CLIP/CLIR switch key is depressed in the step S63, since the "CLIP" is selected in the call generation just at that particular time, the flow advances to the step S64 to set flag_cli=CLIP=0.

Figure 7:
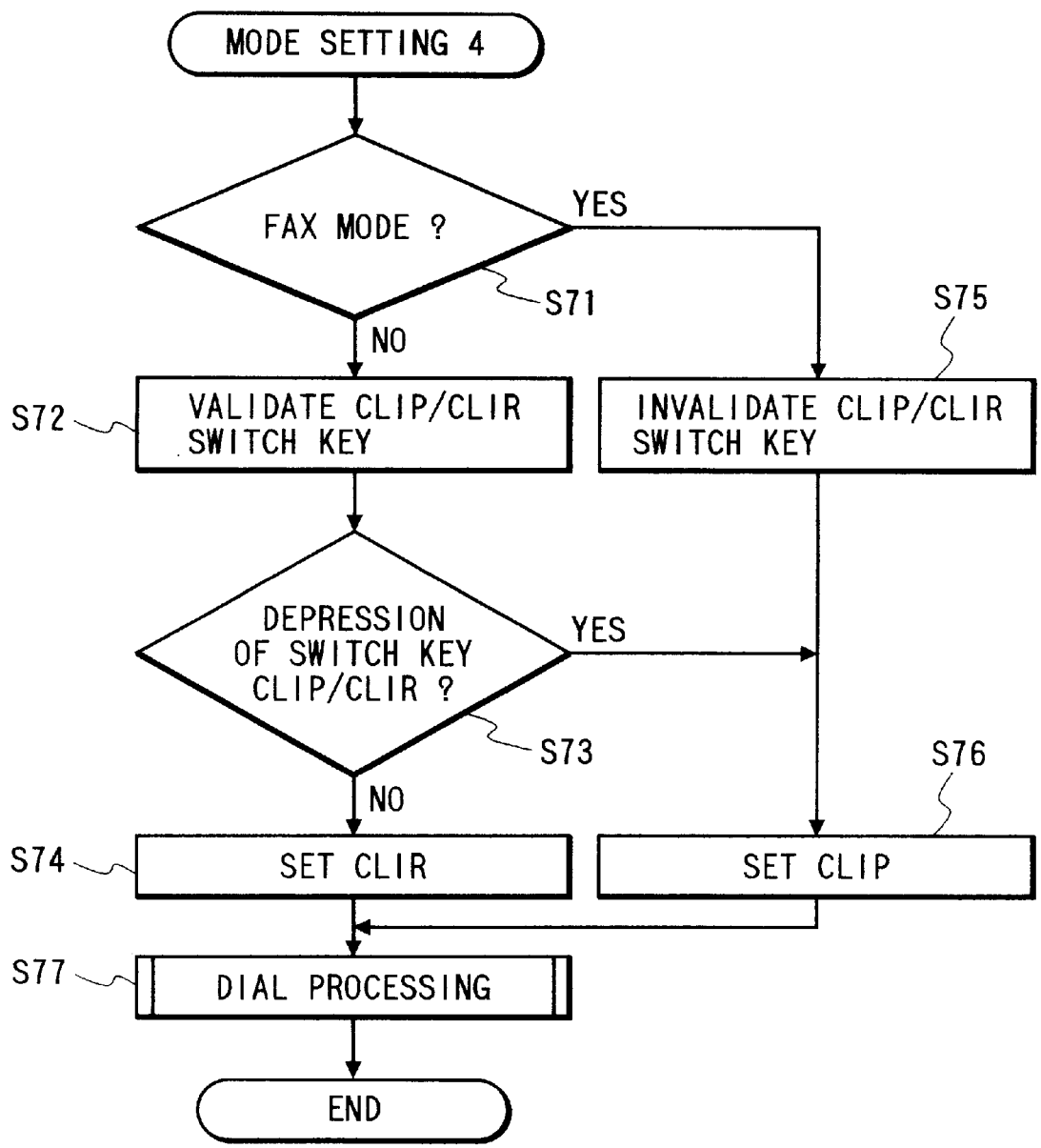
FIG. 7 is a flow chart showing the setting processing of CLIP/CLIR in a fourth embodiment of the present invention.

FIG. 7 is a flow chart showing the setting processing (mode setting 4) of the CLIP/CLIR in a fourth embodiment of the present invention.

In the present embodiment, the operation of the CLIP/CLIR switch key is invalidated during the facsimile communication mode.

This is because, in the facsimile communication, even if the CLIP is set not to be performed at the call generation time, the CLIP is actually performed in the facsimile communication procedure. Namely, it is meaningless to set the CLIP not to be performed at the call generation time.

As shown in FIG. 7, in a step S71, the communication mode is judged in the same manner as that in the first embodiment. In this case, if the object of the call generation is directed to the facsimile communication, the flow advances to a step S75. Then, it is set in this step that the operation of the CLIP/CLIR switch key is invalidated even if such the key is operated. Subsequently, in a step S76, the call generation control variable is set as flag_cli=CLIP=0 , and then the flow advances to a step S77 to execute the dial processing shown in FIG. 2 or 3.

On the other hand, if the object of the call generation is directed to the telephone speaking, it is set in a step S72 that the operation of the CLIP/CLIR switch key is validated when such the key is operated. Then, it is judged in a step S73 whether or not the CLIP/CLIR switch key is operated or depressed. If depressed, the flow advances to the step S76 to set flag_cli=CLIP=0, and then the flow further advances to the step S77 to execute the dial processing shown in FIG. 2 or 3.

On the other hand, if not depressed, the flow advances to a step S74 to set flag_cli=CLIR=1, and then the flow further advances to the step S77 to execute the dial processing shown in FIG. 2 or 3.

By such the operation, although the "CLIR" is always being set in the telephone mode, such the setting can be changed to the "CLIP" by the operation of the CLIP/CLIR switch key. In addition, the call can be always generated with the "CLIP" in the facsimile communication mode.

Figure 8:
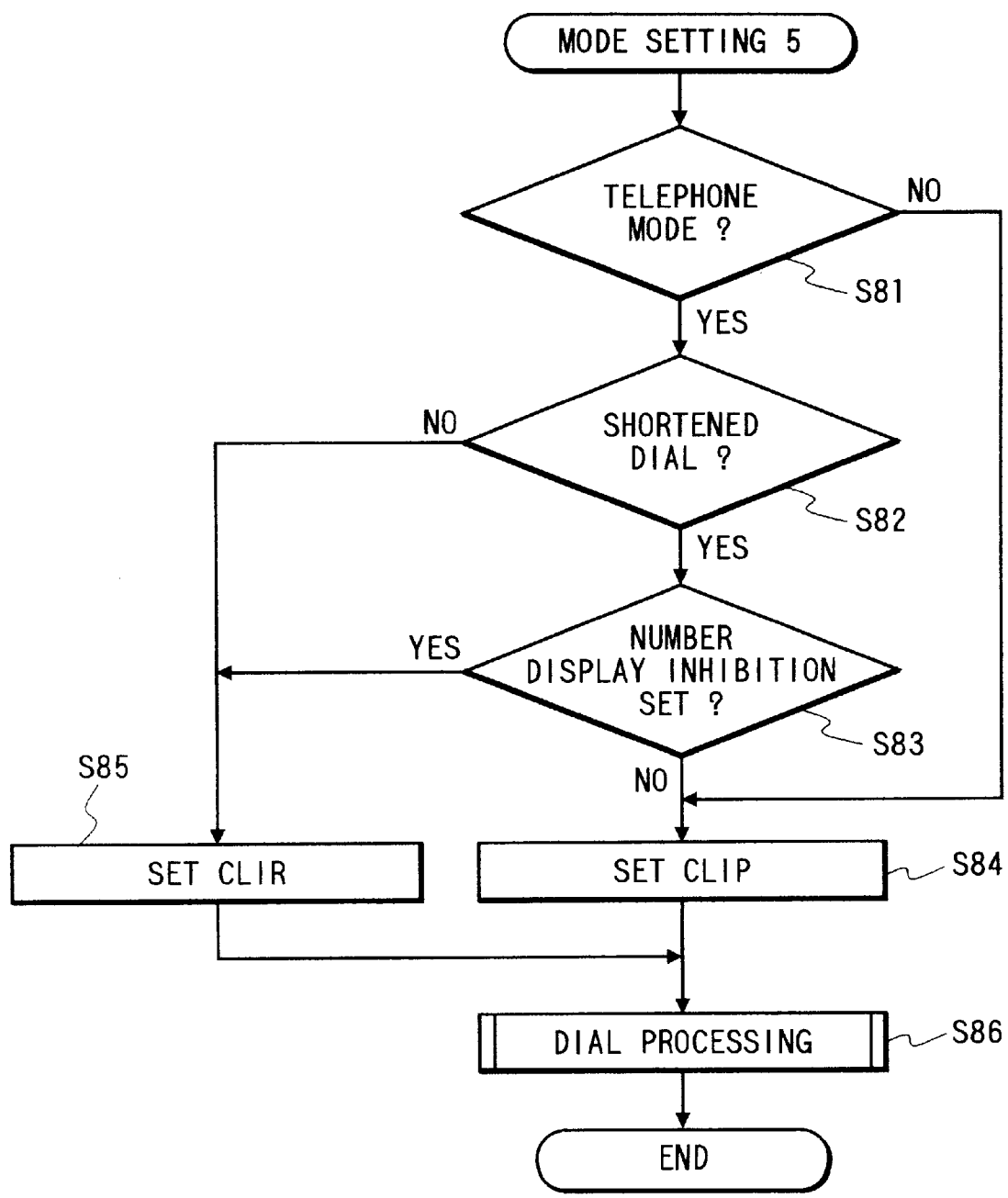
FIG. 8 is a flow chart showing the setting processing of CLIP/CLIR in a fifth embodiment of the present invention.

FIG. 8 is a flow chart showing the setting processing (mode setting 5) of the CLIP/CLIR in a fifth embodiment of the present invention.

In the present embodiment, because of the same reason as in the fourth embodiment, in the telephone mode, the "CLIP" and the "CLIR" are switched according to the registered contents of the shortened dial. However, in the facsimile communication mode, the call is always generated with the "CLIP" irrespective of the registered contents of the shortened dial.

As shown in FIG. 8, in a step S81, the communication mode is judged in the same manner as that in the first embodiment. In this case, if the object of the call generation is directed to the facsimile communication, the flow advances to a step S84 to set flag_cli=CLIP=0 and then advances to a step S86 to execute the dial processing shown in FIG. 2 or 3, irrespective of whether or not the call is generated based on the shortened dial, and irrespective of the registered contents of the shortened dial.

On the other hand, if the object of the call generation is directed to the telephone speaking, it is judged in a step S82 whether or not the call is generated based on the shortened dial. If the call is not generated based on the shortened dial, since the destination can not be identified, the flow advances to a step S85 to set flag_cli=CLIR=1 and then advances to the step S86 to execute the dial processing shown in FIG. 2 or 3.

On the other hand, if the call is generated based on the shortened dial, the flow advances to a step S83 to judge the additional information which is the setting information of the CLIP/CLIR and has been registered together with the shortened dial, and judge whether or not the call is generated to the destination to which the CLIP should be performed. If the call is generated to the destination to which the CLIP should not be performed, the flow advances to the step S85 to set flag_cli=CLIR=1 and then advances to the step S86 to execute the dial processing shown in FIG. 2 or 3.

On the other hand, if the call is generated to the destination to which the CLIP should be performed, the flow advances to the step S84 to set flag_cli=CLIP=0 and then advances to the step S86 to execute the dial processing shown in FIG. 2 or 3.

By such the operation, in the telephone mode, the "CLIP" and the "CLIR" are set according to the registered contents of the shortened dial. However, in the facsimile communication mode, the call can be always generated with "CLIP".

In each of the above-described first to fifth embodiments, the present invention is simplified as much as possible for the explanation. However, when the present invention is applied to the actual communication apparatus, it is desirable to perform the fine controlling by appropriately combining the above embodiments with others. For example, the following combinations can be applied.

(1) In the case where the basic setting in the telephone mode and the facsimile communication mode have been set respectively as the "CLIR" and the "CLIP", the telephone speaking based on the shortened dial on which the "CLIP" has been set is performed with the "CLIP".

(2) In the case where the basic setting in the telephone mode and the facsimile communication mode have been set respectively as the "CLIR" and the "CLIP", when the CLIP/CLIR switch key is temporarily depressed and then the transmission is performed, the facsimile communication is performed with the "CLIR".

In such the case, when the "CLIR" is set in the facsimile communication mode, e.g., further processing to make an own-station subscriber's number notified in the facsimile communication procedure secret can be also added.

As explained above, according to the present invention, the functions such as the call line identification presentation (CLIP) and the call line identification restriction (CLIR) which are provided in the public switched telephone network (PSTN), the integrated services digital network (ISDN) and the like can be more effectively utilized.

What is claimed is:

1. A communication apparatus, which can generate a call in at least one of a speaking communication mode to perform speaking and a data communication mode to perform data communication, and which can be connected to a communication network to provide a service that notifies a called side of discrimination information of a calling side, said apparatus comprising:

a judgment circuit arranged to judge a communication mode in a case in which a call is to be generated;

a switch arranged to switch a setting indicating whether or not the service is to be performed, according to a judgment by said judgment circuit; and a call generator arranged to generate a call based on the setting switched by said switch.

2. An apparatus according to claim 1, further comprising:

a memory arranged to store information in a case in which a call is generated to an apparatus of a communication destination; and a discrimination circuit arranged to discriminate whether or not a call is based on the information stored in said memory, wherein said switch switches the setting indicating whether or not the service is to be performed, according to a discrimination result of said discrimination circuit.

3. An apparatus according to claim 1, further comprising:
a memory arranged to store information in a case in which a call is generated to an apparatus of a communication destination,
wherein said switch switches the setting indicating whether or not the service is to be performed, based on the information stored in said memory.

4. An apparatus according to claim 3, wherein switching by said switch, made according to the information stored in said memory, is validated according to the communication mode.

5. An apparatus according to claim 1, wherein said switch comprises a control circuit arranged to control switching based on an operator's handling, and said switch performs the switching responsive to an instruction from the control circuit.

6. An apparatus according to claim 5, wherein the operator's handling is invalidated or validated according to the communication mode.

7. An apparatus according to claim 1, wherein the communication network is a public switched telephone network.

8. An apparatus according to claim 1, wherein the communication network is an integrated services digital network.

9. A method for controlling a communication apparatus, which can generate a call in at least one of a speaking communication mode to perform speaking and a data communication mode to perform data communication, and which can be connected to a communication network to provide a service that notifies a called side of discrimination information of a calling side, said method comprising:
a judgment step of judging a communication mode in a case in which a call is generated;
a switch step of switching a setting indicating whether or not the service is to be performed, according to a judgment in said judgment step; and
a call generation step of generating a call based on the setting in said switch step.

10. A method according to claim 9, further comprising:
a storage step of storing information in a case in which a call is generated to an apparatus of a communication destination; and
a discrimination step of discriminating whether or not a call is based on the information stored in said storage step,
wherein said switch step switches the setting indicating whether or not the service is to be performed, according to a discrimination result in said discrimination step.

11. A method according to claim 9, further comprising:
a storage step of storing information in a case in which a call is generated to an apparatus of a communication destination,
wherein said switch step switches the setting indicating whether or not the service is to be performed, based on the information stored in said storage step.

12. A method according to claim 11, wherein the switching in said switch step, made based on the information stored in said storage step, is invalidated or validated according to the communication mode.

13. A method according to claim 9, wherein said switch step comprises a control step of controlling the switching based on an operator's handling, and said switch step performs the switching responsive to an instruction in the control step.

14. A method according to claim 13, wherein the operator's handling is invalidated or validated according to the communication mode.

15. A method according to claim 9, wherein the communication network is a public switched telephone network.

16. A method according to claim 9, wherein the communication network is an integrated services digital network.

17. A program storage medium readable by a machine, tangibly embodying a program of instructions executable by the machine to perform a method for controlling a communication apparatus, the apparatus capable of generating a call in at least one of a speaking communication mode to perform speaking and a data communication mode to perform data communication, and the apparatus capable of connecting to a communication network to provide a service that notifies a called side of discrimination information of a calling side, the method comprising:
a judgment step of judging a communication mode in a case in which a call is generated;
a switch step of switching a setting indicating whether or not the service is to be performed according to a judgment in said judgment step; and
a call generation step of generating a call based on the setting in said switch step.

18. A medium according to claim 17,
wherein the method further comprises:
a storage step of storing information in a case in which a call is generated to an apparatus of a communication destination, and
a discrimination step of discriminating whether or not a call is based on the information stored in said storage step, and
wherein said switch step switches the setting indicating whether or not the service is to be performed, according to a discrimination result in said discrimination step.

19. A medium according to claim 17, wherein
the method further comprises a storage step of storing information in a case in which a call is generated to an apparatus of a communication destination, and
said switch step switches the setting indicating whether or not the service is to be performed, based on the information stored in said storage step.

20. A medium according to claim 19, wherein the switching in said switch step, made based on the information stored in said storage steps is invalidated or validated according to the communication mode.

21. A medium according to claim 17, wherein said switch step comprises a control step of controlling the switching based on an operator's handling, and said switch step performs the switching responsive to an instruction in the control step.

22. A medium according to claim 21, wherein the operator's handling is invalidated or validated according to the communication mode.

23. A medium according to claim 17, wherein the communication network is a public switched telephone network.

24. A medium according to claim 17, wherein the communication network is an integrated services digital network.

25. A communication apparatus, which can generate a call in at least one of a speaking communication mode to perform speaking and a data communication mode to perform data communication, and which can be connected to a communication network to provide a service that notifies a called side of discrimination information of a calling side, said apparatus comprising:

a judgment circuit arranged to judge the communication mode in a case in which a call is to be generated; and a call generator arranged to generate a call to perform the service or a call not to perform the service, according to a judgment by said judgment circuit.

26. An apparatus according to claim 25, further comprising:

a memory arranged to store information in a case in which a call is generated to a communication destination's apparatus; and a discrimination circuit arranged to discriminate whether or not a call is based on the information stored in said memory, wherein said call generator generates a call to perform the service or a call not to perform the service, according to a discrimination result of said discrimination circuit.

27. An apparatus according to claim 25, further comprising:

a memory arranged to store information in a case in which a call is generated to a communication destination's apparatus, wherein said call generator generates a call to perform the service or a call not to perform the service, based on the information stored in said memory.

28. An apparatus according to claim 27, wherein said call generator comprises a switch arranged to switch a setting indicating whether or not the service is to be performed to the communication destination's apparatus, and switching by the switch is invalidated or validated according to the communication mode.

29. An apparatus according to claim 28, wherein the switch comprises a control circuit arranged to control switching by the switch based on an operator's handling, and the switch performs switching responsive to an instruction from the control circuit.

30. An apparatus according to claim 29, wherein the operator's handling is invalidated or validated according to the communication mode.

31. An apparatus according to claim 25, wherein the communication network is a public switched telephone network.

32. An apparatus according to claim 25, wherein the communication network is an integrated services digital network.

33. A method for controlling a communication apparatus, which can generate a call in at least one of a speaking communication mode to perform speaking and a data communication mode to perform data communication, and which can be connected to a communication network to provide a service that notifies a called side of discrimination information of a calling side, said method comprising:

a judgment step of judging the communication mode in a case in which a call is generated; and a call generation step of generating a call to perform the service or a call not to perform the service, according to a judgment in said judgment step.

34. A method according to claim 33, further comprising:

a storage step of storing information in a case in which a call is generated to an apparatus of a communication destination; and a discrimination step of discriminating whether or not the call is based on the information stored in said storage step, wherein said call generation step generates a call to perform the service or a call not to perform the service, according to a discrimination result in said discrimination step.

35. A method according to claim 33, further comprising:

a storage step of storing information in a case in which a call is generated to a communication destination's apparatus, wherein said call generation step generates a call to perform the service or a call not to perform the service, based on the information stored in said storage step.

36. A method according to claim 35, wherein said call generation step comprises a switch step of switching a setting indicating whether or not the service is to be performed to a communication destination, and the switching in said switch step is invalidated or validated according to the communication mode.

37. A method according to claim 36, wherein said switch step comprises a control step of controlling the switching based on an operator's handling, and said switch step performs the switching responsive to an instruction in the control step.

38. A method according to claim 37, wherein the operator's handling is invalidated or validated according to the communication mode.

39. A method according to claim 33, wherein the communication network is a public switched telephone network.

40. A method according to claim 33, wherein the communication network is an integrated services digital network.

41. A program storage medium readable by a machine, tangibly embodying a program of instructions executable by the machine to perform a method for controlling a communication apparatus, the apparatus capable of generating a call in at least one of a speaking communication mode to perform speaking and a data communication mode to perform data communication, and the apparatus capable of connecting to a communication network to provide a service that notifies to a called side discrimination information of a calling side, the method comprising:

a judgment step of judging the communication mode in a case in which a call is generated; and a call generation step of generating a call to perform the service or a call not to perform the service, according to a judgment in said judgment step.

42. A medium according to claim 41, wherein the method further comprises:

a storage step of storing information in a case in which a call is generated to a communication destination's apparatus, and a discrimination step of discriminating whether or not a call is based on the information stored in said storage step, and wherein said call generation step generates a call to perform the service or a call not to perform the service, according to a discrimination result in said discrimination step.

43. A medium according to claim 41, wherein said method further comprises a storage step of storing information in a case in which a call is generated to a communication destination's apparatus, and wherein said call generation step generates a call to perform the service or a call not to perform the service, based on the information stored in said storage step.

44. A medium according to claim 43, wherein said call generation step comprises a switch step of switching a setting indicating whether or not the service is to be performed to the communication destination's apparatus, and the switching in said switch step is invalidated or validated according to the communication mode.

45. A medium according to claim 44, wherein said switch step comprises a control step of controlling the switching based on an operator's handling, and said switch step performs the switching responsive to an instruction in the control step.

46. A medium according to claim 45, wherein the operator's handling is invalidated or validated according to the communication mode.

47. A medium according to claim 41, wherein the communication network is a public switched telephone network.

48. A medium according to claim 41, wherein the communication network is an integrated services digital network.

49. A communication apparatus, which is connectable to a communication network to provide a service that notifies a called side of discrimination information of a calling side, said apparatus comprising:

- a memory arranged to pre-store discrimination information in relation to a communication destination;
- a judgment circuit arranged to judge whether or not a call is to be generated by using the discrimination information pre-stored in said memory; and
- a call generator arranged to generate a call to perform the service or a call not to perform the service according to a judgment by said judgment circuit.

50. An apparatus according to claims 49, wherein said call generator generates a call to perform the service in a case where said judgment circuit judges that the call is not generated by using the discrimination information pre-stored in said memory.

51. An apparatus according to claim 49, wherein a second information for discriminating whether or not the service is to be performed is also stored in said memory, and said call generator generates a call based on the second information in a case where the call is generated by using the discrimination information pre-stored in said memory.

52. A communication method for connecting a communication apparatus to a communication network, which can provide a service that notifies a called side of discrimination information of a calling side, said method comprising:

- a memory step, of arranging pre-stored discrimination information in relation to a communication destination;
- a judgment step, of arranging to judge whether or not a call is to be generated by using the discrimination information pre-stored in said memory step; and
- a call generation step, of arranging to generate a call to perform the service or a call not to perform the service according to a judgment made in said judgment step.

53. A method according to claim 52, wherein the call generated in said call generation step performs the service in a case where the judgment circuit in said judgment step judges that the call is not generated by using said discrimination information pre-stored in said memory step.

54. A method according to claim 52, wherein second information for discriminating whether or not the service is to be performed is also stored in said memory step, and the call generated in said call generation step is based on the second information in a case where the call is generated by using said discrimination information pre-stored in said memory step.

55. A program storage medium readable by a machine, tangibly embodying a program of instructions executable by the machine to perform a method of connecting a communication apparatus to a communication network to provide a service that notifies a called side of discrimination information of a calling side, the method comprising:

- a memory step, of arranging pre-stored discrimination information in relation to a communication destination;
- a judgment step, of arranging to judge whether or not a call is to be generated by using the discrimination information pre-stored in said memory step; and
- a call generation step, of arranging to generate a call to perform the service or a call not to perform the service according to a judgment made in said judgment step.

56. A medium according to claim 55, wherein the call generated in said call generation step performs the service in a case where the judgment circuit in said judgment step judges that the call is not generated by using said discrimination information pre-stored in said memory step.

57. A medium according to claim 55, wherein a second information for discriminating whether or not the service is to be performed is also stored in said memory step, and the call generated in said call generation step is based on the second information in a case where the call is generated by using said discrimination information pre-stored in said memory step.

\* \* \* \* \*

UNITED STATES PATENT AND TRADEMARK OFFICE
CERTIFICATE OF CORRECTION

PATENT NO.    : 6,278,774 B1
DATED         : August 21, 2001
INVENTOR(S)   : Motoaki Yoshino It is certified that error appears in the above-identified patent and that said Letters Patent is hereby corrected as shown below:

Column 6,
Line 38, "be also" should read -- also be --.

Column 8,
Line 21, "performed" should read -- performed, --.
Line 29, "destination," should read -- destination; --.
Line 32, "and" should be deleted.
Line 46, "steps" should read -- step, --.

Column 10,
Line 49, "apparatus," should read -- apparatus; --.
Line 52, "and" should be deleted.

Signed and Sealed this

Fifth Day of March, 2002

*Attest:*

JAMES E. ROGAN
*Attesting Officer*     Director of the United States Patent and Trademark Office